106. COMPOSITIONS, COATING OR PLASTIC.

91

UNITED STATES PATENT OFFICE.

LYCURGUS LAUGHLIN BOBLETT, OF KNIGHTSTOWN, INDIANA.

MANUFACTURE OF ARTIFICIAL STONE AND MARBLE.

SPECIFICATION forming part of Letters Patent No. 343,695, dated June 15, 1886.

Application filed September 23, 1885. Serial No. 177,962. (Specimens.)

*To all whom it may concern:*

Be it known that I, LYCURGUS LAUGHLIN BOBLETT, of Knightstown, in the county of Henry and State of Indiana, have invented certain new and useful Improvements in the Manufacture of Artificial Stone and Marble; and I hereby declare the following to be a full, clear, and exact description thereof.

My invention relates to an improved composition formed of certain ingredients mixed together in a dry state, with or without dry coloring-matter, whereby it may be put up in barrels, if desired, ready for immediate use in any locality to which it may be transported, said composition when afterward mixed or dampened with water producing a beautiful imitation of natural stone or marble, which, when dry, will become a hard crystallized or petrified substance possessing the necessary strength, hardness, and durability to adapt it for use as a building material in any climate and for a variety of other purposes, as it is impervious to water and will successfully resist the action of frost and heat, as hereinafter set forth.

In carrying my invention into effect I take for artificial stone one hundred pounds of Portland, German, or French cement, and the same quantity of each of the following substances, viz: Lime of Tiel, American cement, and gypsum. I place these ingredients in a large bin, or other suitable receptacle, and after mingling them well together I add four hundred pounds of pure sharp silicious fine white sand, and thoroughly mix the whole together, and then add in a dry state and thoroughly incorporate therewith the following ingredients in the proportions specified, which may be first mixed together to form a compound, or added to the mass separately, as preferred, viz: Three and one-half pounds of bryonia, two and one-quarter pounds of sal-ammoniac, two pounds of apocynum, five and one-half pounds of bromide of calcium, one pound of plumbago, and one pound of pulverized glue. The composition is then placed in barrels and is ready for immediate use.

The above-described composition may be made of any desired color or tint by mixing therewith in a dry state suitable pigments, and the color can thus be made uniform throughout the mass, and of the exact shade required, which is a great advantage, as it obviates all difficulty heretofore experienced by the consumer from want of knowledge in regard to the proper method of mixing the colors to obtain the desired results.

To make artificial stone for buildings and other purposes, I take a sufficient quantity of the above-described composition as it is put up ready for use, either plain or colored, as desired, and add thereto a sufficient quantity of water to thoroughly wet or dampen the same, after which it is tamped or pressed into molds of any desired form or shape in the ordinary manner.

For sidewalks, I lay a foundation composed of ten parts of bank sand and gravel free from loam mixed with one part of my above described composition as put up for use, and add a sufficient quantity of water to thoroughly dampen the same. This foundation is laid to the depth of three or three and one-half inches, after which it is well tamped, and before it becomes set I apply thereto a top layer or coat composed of equal parts of my above-described composition, and pure sharp silicious sand mixed together, and with sufficient water added to render the mass plastic. This top layer should be about one-half inch in thickness, and is to be leveled and smoothed down with a trowel as soon as its condition will admit of this operation.

The same proportions as above described are to be used in manufacturing cemetery-work or coping of any kind, the material being tamped in the same manner.

To manufacture imitation marble, I take two hundred pounds of each of the following substances, viz: Gypsum, precipitated or prepared chalk, calcined plaster, and magnesia, and after thoroughly commingling them I add in a dry state and thoroughly incorporate therewith the following ingredients in the proportions specified, which may be first mixed together to form a compound or added to the mass separately, as preferred, viz: Three and one-half pounds of bryonia, two and one-quarter pounds of sal-ammoniac, two pounds of apocynum, five and one-half pounds of bromide of calcium, and one pound of plumbago, after which the compound is thoroughly dampened or mixed with cold water and placed in suitable molds to give it the desired shape. These molds are to be placed on a hard smooth surface, such as glass or slate, and on this surface is first laid a thin layer of paste composed of any desired color or colors, manipulated in any well-known manner to produce the desired imitation of the veins or figures of natural marble, after which the composition is filled into the mold and the whole compressed as usual.

The bryonia, sal-ammoniac, apocynum, bromide of calcium, and plumbago may be used with or without the glue, and when mixed with the materials forming the base of the artificial stone or marble and thoroughly moistened or dampened with water, as described, will produce a strong and tenacious adhesion of the particles, and cause the entire mass to become crystallized and carbonized, rendering it extremely hard when dry.

The stone or marble after being taken from the mold, or a piece of sidewalk, should be dampened well with water from time to time for three or four days, commencing six or eight hours after the stone or marble is removed from the mold or the sidewalk is laid. This wetting or dampening prevents the outer surface of the material from hardening more rapidly than the interior of the same, and causes the crystallization or petrifaction to be uniform throughout.

Artificial stone and marble made of the above-described composition may be used to advantage for a great variety of purposes—such as building-blocks, exterior and interior decoration of buildings, mantel-pieces, monuments, cemetery-work of all kinds, sewer-pipes, table-tops, tiling, &c—as it can be easily and cheaply molded, and the particles of which it is composed are thoroughly blended and will adhere closely and tenaciously together, and when thoroughly dry become crystallized or petrified, so as to form a hard, solid, homogeneous mass impervious to air and water and capable of resisting the action of fire, frost, and other disintegrating influences.

A great advantage resulting from putting up the above described composition in a dry state in barrels all ready for use is that it enables unskilled persons to manufacture articles therefrom or otherwise employ it, as it is evenly mixed and of uniform color throughout, it being merely necessary to add a suitable quantity of water and treat the mixture as above described, which operations can be performed by any person of ordinary intelligence.

What I claim as my invention, and desire to secure by Letters Patent, is—

1. The herein-described composition mixed in a dry state ready for use, consisting of cement, lime of Tiel, gypsum, and sand, or gypsum, precipitated or prepared chalk, calcined plaster, and magnesia, as a base, combined with bryonia, sal-ammoniac, apocynum, bromide of calcium, and plumbago, with or without glue, and adapted to be united and solidified by dampening or wetting the same with water or mixing water therewith, substantially as described.

2. An artificial stone or marble composed of cement, lime of Tiel, gypsum, and sand, or gypsum, precipitated or prepared chalk, calcined plaster, and magnesia, as a base, combined with bryonia, sal-ammoniac, apocynum, bromide of calcium, and plumbago, with or without glue, and united and solidified by dampening or wetting the same with water or mixing water therewith, substantially as set forth.

3. The herein-described dry petrifying or crystallizing compound, consisting of bryonia, sal-ammoniac, apocynum, bromide of calcium, and plumbago, with or without glue, substantially in the proportions named, and adapted to be mixed with the materials forming the base of the stone or marble, and afterward united therewith to form a hard crystallized or petrified mass by the addition of water, substantially as described.

Witness my hand this 19th day of September, A. D. 1885.

LYCURGUS LAUGHLIN BOBLETT.

In presence of—
P. G. HULL,
C. WILLOUGHBY.